June 19, 1928.

T. A. RICH

ELECTRIC MEASURING INSTRUMENT

Filed April 2, 1927    2 Sheets-Sheet 1

1,674,482

Inventor:
Theodore A. Rich,
by *(signature)*
His Attorney.

June 19, 1928.  
T. A. RICH  
1,674,482  
ELECTRIC MEASURING INSTRUMENT  
Filed April 2, 1927  2 Sheets-Sheet 2
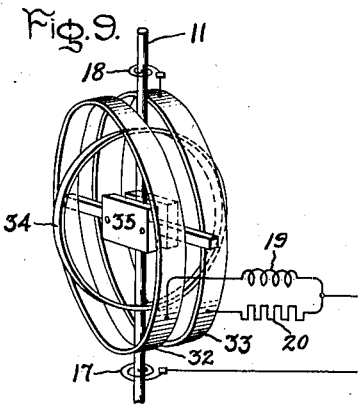
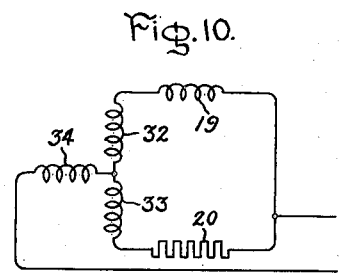
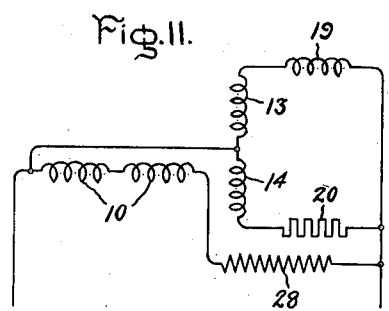
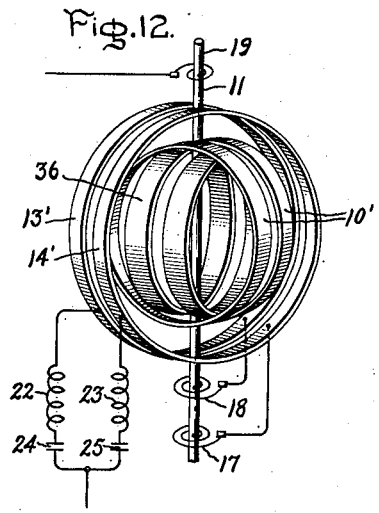
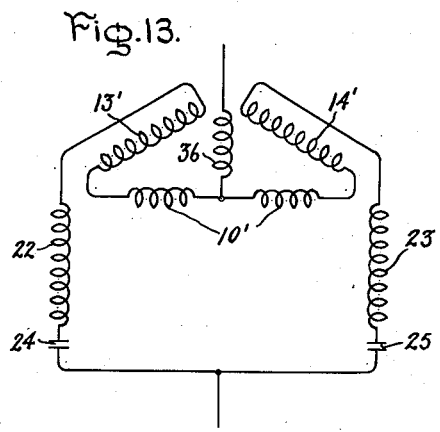
Inventor:  
Theodore A. Rich,  
by  
His Attorney.

Patented June 19, 1928.

1,674,482

UNITED STATES PATENT OFFICE.

THEODORE A. RICH, OF EAST LYNN, MASSACHUSETTS, ASSIGNOR TO GENERAL ELECTRIC COMPANY, A CORPORATION OF NEW YORK.

ELECTRIC MEASURING INSTRUMENT.

Application filed April 2, 1927. Serial No. 180,558.

My invention relates to electric measuring instruments and devices and in particular to a frequency responsive device of high sensitiveness such as will indicate minute variations in frequency with a comparatively large scale deflection. In general, it may be stated that modern requirements demand a far greater sensitivity of frequency indicators than of most alternating current instruments. For example, frequency indicators having a 90 degree scale reading from 55 to 65 cycles upon which a change of 1/100th of a cycle is readable may be considered to be sensitive and yet greater sensitivity than this is desired in some instances. Instruments of the character under discussion may be classified in three groups, as follows: (1) those giving an indication proportional to the quantity being measured; (2) those giving an indication which is the resultant of two quantities; and (3) those giving an indication which is proportional to the difference of the two quantities.

Practically all continuous range frequency indicators in use at the present time are of the cross-coil type and fall under class (2) and their sensitivity is limited. The instruments of my invention come under class (3) and as will be explained almost any degree of sensitivity desired may be obtained. Other advantages of my invention will appear as the description proceeds.

Figure 2:
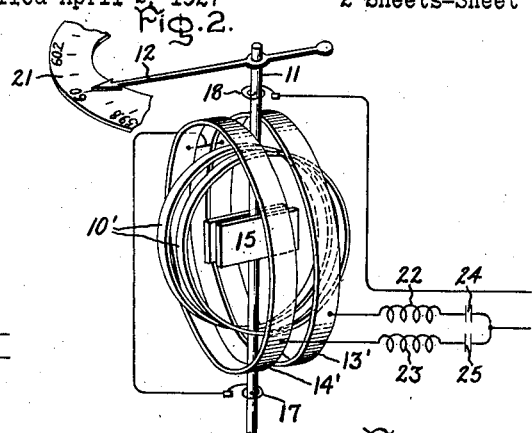
Figure 3:
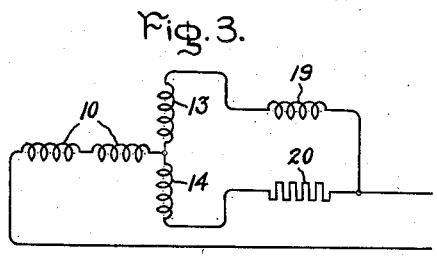
Figure 4:
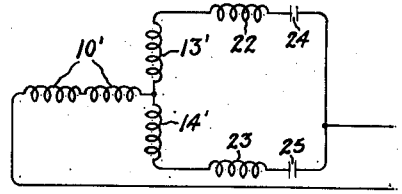
Figure 5:
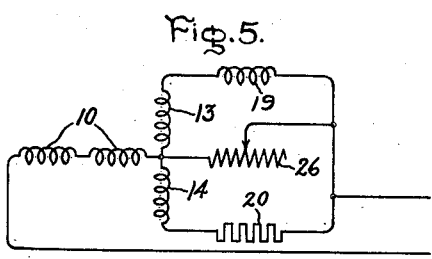
Figure 6:
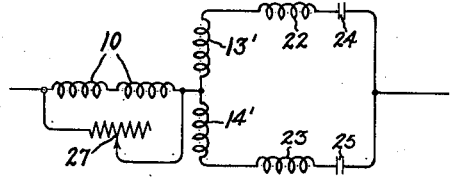
Figure 7:
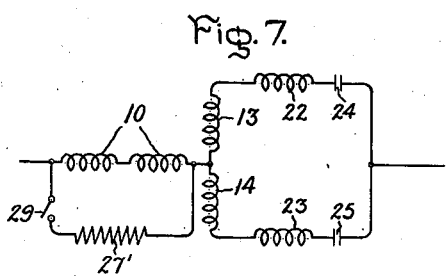
Figure 8:
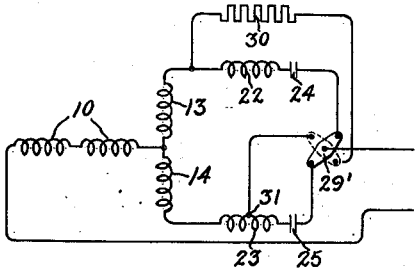

The features of my invention which are believed to be novel and patentable will be pointed out in the claims appended hereto. For a better understanding of my invention reference is made in the following description to the accompanying drawing which shows in Fig. 1 a preferred embodiment of my invention for long range instruments; Fig. 2 shows the preferred type for short range instruments; Fig. 3 shows the electrical circuit arrangement of the instrument of Fig. 1; Fig. 4 shows the electrical circuit arrangements of Fig. 2; Figs. 5 and 6 are other circuit connections which may be used with the instrument to obtain a fine adjustment of scale length; Figs. 7 and 8 show the electrical connections of possible double range instruments; coming under the invention; Figs. 9 and 10 show the assembly and electrical circuit arrangements respectively of another adaptation of this differential principle; Fig. 11 shows the circuit connections of an instrument in which the field is separately excited; Fig. 12 shows a high torque instrument in which the magnetic vane is replaced by a coil and Fig. 13 represents the electrical connections of the instrument of Fig. 12.

Figure 1:
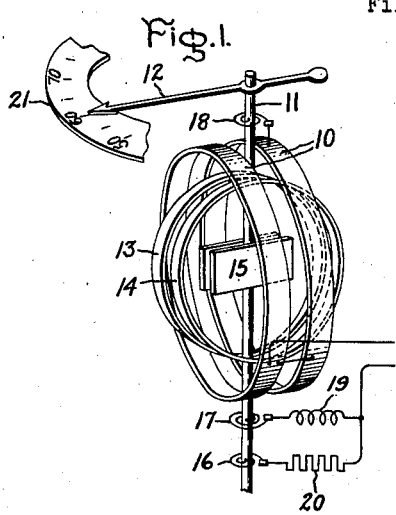

Referring to Fig. 1, the instrument here illustrated has a stationary field winding 10 divided into two parts for the purpose of symmetry. Both sections are wound in the same direction and are connected in series and electrically may be considered as one winding. The moving element armature comprises a shaft 11 carrying a pointer 12, a pair of coils 13 and 14, and a magnetic vane 15 fixed to the shaft approximately or exactly in the plane of the coils 13 and 14. The magnetic vane is preferably made in two parts which are placed on opposite sides of the shaft. The electrical connections to the movable coils 13 and 14 are carried through spiral or flexible conductors 16, 17 and 18. These spirals are arranged to have the lowest possible torque in order that their effect on the deflection of the instrument will be negligible. The instrument is connected to the circuit the frequency of which is to be measured as shown in Figs. 1 and 3. It is seen that coils 13 and 14 are placed side by side and have a common flux axis and are connected to produce opposing fluxes and that their circuit connections include means for varying the current distribution between the coils as the frequency varies. Thus the circuit of coil 13 contains an inductance 19 and that of coil 14 a resistance 20. These parallel circuits are connected in series with the stationary winding 10 across the line. The resistance and inductance are preferably adjusted so that the resultant flux produced by coils 13 and 14 will be zero at the central range of frequency for which the instrument is used, for example, 60 cycles. The pointer 12 cooperates with a wide scale 21 which generally extends over an arc of about 90 degrees and the pointer is adjusted with respect thereto so that it gives a mid-scale deflection at the normal frequency assumed to be 60 cycles in the example given. At this frequency the torque of coils 13 and 14 exactly neutralize each other and their resultant torque is zero and the movable armature member is maintained in the position indicated by reason of the magnetic vane 15 which now aligns itself with the axis of the flux field produced by the stationary winding 10. When the frequency is above this value, less current will flow through the branch containing inductance 19 while the current through the branch containing resistance 20 is not changed and as a consequence the difference in the torque produced by coils 13 and 14 will tend to turn the armature at right angles to the position indicated. In other words, coil 14 will now tend to align itself with the stationary coils by turning clockwise, in Fig. 1, and would do so if it were not for the iron vane 15 which establishes a flux along its axis and tends to stay in the position shown since here the reluctance of its magnetic circuit is a minimum. Upon a decrease in frequency from this value, coil 13 will predominate and produce an opposite deflection. Thus we have three forces: (1) one produced by coil 13 and coil 10 down scale; (2) one by coil 14 and coil 10 up scale; and (3) one due to the magnetic vanes 15 and coil 10. As a result of these three forces the position which the armature takes will depend upon the relative magnitude and polarity of the difference in torques of the armature coils and the stationary field and torque between the iron vane and stationary field. It is at once apparent that any degree of sensitivity desired may be had by modifying the magnitude of the torque between the iron vane and stationary field, for example by varying the dimensions or permeability of the magnetic vane.

I have found that the scale distribution may be altered by changing the angle between moving coils 13, 14 and the magnetic vane 15. When the coils and vane are in the same plane the scale is substantially logarithmic which is almost always to be preferred in any long range instrument and in a short range instrument slight difference between a logarithmic scale and a uniform scale is hardly noticeable. If this angle becomes too great, the instrument will become unbalanced and there will be a portion of the scale where the pointer will not come to rest. If the frequency is carried beyond this point the pointer will be violently thrown against the stops. This condition is of course undesirable in a frequency meter but may be a very desirable feature where the device is used as a relay.

The sensitivity may also be varied by increasing or decreasing the sensitiveness of the frequency responsive circuits 19 and 20 as will be hereinafter explained. The instrument scale shown in Fig. 2 is graduated from 59.8 cycles to 60.2 cycles corresponding to a full scale range for less than one-half cycle. A change of 0.0005 cycles may be readily detected on this scale corresponding to a very high degree of sensitivity and this degree of sensitivity has been obtained in a practicable instrument.

Voltage variations of ordinary magnitude will not affect the indications of the instrument since all the torques vary the same way with voltage. Thus an increase in voltage applied to the circuits shown in Fig. 1 will cause an increase in the difference of the torques between (13 and 10) and (14 and 10) but it will cause an equal increase in the torque between the magnetic vane and coil 10. The instrument is easy to manufacture and relatively inexpensive. The torque is much higher for a given loss than in the usual cross-coil frequency instrument and can be raised to almost any degree desired. The current which flows in winding 10 should not be considered as the sum of the currents in coils 13 and 14 but rather as the resultant since the currents in coils 13 and 14 may have widely different phase relations.

It is evident that exactly the same differential principle described above in connection with Fig. 1 would exist if we used the two winding parts marked 13 and 14 of Fig. 1 as the single series connected winding and the two winding parts marked 10 of Fig. 1 as the differential connected coils in the parallel resonant circuits as shown in Figs. 2 and 4. The only practicable difference would be in the connections and in the number of turns, it being desirable to keep the number of turns on the moving part (winding 10' in Fig. 2) as low as possible for the sake of lightness. In this alternative arrangement the magnetic vane would tend to align itself with resultant flux of the stationary field produced by coils 13' and 14' and the movable armature would tend to turn in one direction or the other from the position shown in Fig. 2 depending upon the phase of the resultant flux of the armature, which in turn would depend upon the frequency. For high sensitivity instruments this connection is especially desirable. It is necessary in such instruments to have the circuits highly reactive, one lagging, the other leading in order to have large changes of current with frequency. This is accomplished in Figs. 2 and 4 by employing suitable combinations of inductance and capacity as indicated at 22, 23, 24 and 25. If the coils were arranged as shown in Fig. 1 with the circuit shown in Fig. 4, the 90 degree components (which in practice are the largest) would subtract and the torque would be low. The arrangement in Fig. 2 causes the 90 degree components to add in the field and thus the torque is high and the currents which produce the torque vary rapidly with frequency.

Fig. 5 shows how the instrument circuit may be modified to adjust the length of the scale. The strength of the stationary field may be strengthened with respect to the movable field and consequently the torque between iron vane and stationary field may be relatively increased by shunting a portion of the stationary field current around the movable coils and their frequency responsive circuits by means of the resistor shown at 26. By adjustment of the resistance 26 the length of scale deflection may be accurately adjusted.

A similar adjustment for scale ends may be obtained for the high sensitivity instruments as shown in Fig. 6 by shunting a portion of the armature current through resistance 27.

In some cases it may be desirable to separately excite the field through a limiting resistance 28 as shown in Fig. 11. Although Fig. 11 shows the field excited by in-phase current, either lagging or leading current may be used.

A double range instrument has been made as shown in Fig. 7. Here a resistance 27' and a switch 29 are employed in shunt to the winding 10. For example, to make a double range frequency indicator having a range of 59—61 cycles and another range from 55 to 65 cycles, inductance 22 and condenser 24 are made resonant to 69 cycles approximately and inductance 23 and condenser 25 are made resonant to 51 cycles approximately. Then with switch 29 open the instrument will respond to a full scale deflection when the frequency is varied between 59 and 61 cycles. With switch 29 closed the instrument will have a full scale deflection when the frequency is varied between 55 and 65 cycles.

I have made another double scale frequency instrument as shown in Fig. 8. With the switch 29' in the position shown in full lines the instrument gives a full scale deflection from 59 to 61 cycles. When the switch is turned to the position shown in dotted lines inductance 22 and condenser 24 are cut out and replaced by a resistance 30. Condenser 25 is also cut out and the inductance 23 is tapped at 31. This modified circuit now responds so that the full scale deflection corresponds to a variation in frequency from 20 to 90 cycles.

In Fig. 9, I have shown another modification of the invention which operates upon the same principle as that previously explained. The essential difference is that the stationary and movable parts are interchanged. Here stationary coils 32 and 33 are differentially connected in parallel circuits including frequency responsive devices 19 and 20 as shown in Fig. 10, and the movable coil 34 is connected in series with these parallel circuits across the frequency source to be measured. A stationary magnetic vane 35 is provided and arranged parallel to the stationary coils 32 and 33 with its longitudinal axis at right angles to their common flux axis. Coils 32 and 33 produce opposing torques with coil 34 and when the frequency is such that these coils produce equal torques or a zero resultant torque, the movable coil takes the position illustrated at right angles to the magnetic vanes 35. When the frequency varies, a change occurs in the torques between the stationary coils and coil 34 and the movable coil then tends to rotate into a new position. At the same time the iron vanes tend to prevent the movable coil from so rotating. Thus the armature will move until the differential torque of coils 32 and 33 with 34 balances the torque between 34 and 35.

It is apparent that the various modifications applied to the previously described type would be equally applicable here.

To increase the restoring torque furnished by the magnetic vane in any of these instruments the latter could be replaced by another coil at right angles to the armature coil. Fig. 12 shows such arrangement of coils and Fig. 13 shows the connections.

The coils 13', 14' and 10' of this instrument are arranged and connected as in Fig. 2. The magnetic vane 15 of Fig. 2 is replaced in Fig. 12 by a winding 36 which is connected in series with the instrument as represented in Fig. 13. The winding 36 establishes a flux at right angles to the winding 10' and has the same effect as the magnetic vane but the restoring torque is increased. As a result the other torques may be increased proportionately to make a high torque instrument suitable for recording purposes.

As is usual with instruments of this character, we may keep the frequency constant and obtain a measurement of capacitance or inductance by properly calibrating the instrument for such purposes. The capacitance or inductance to be measured would take the place of one of the elements 19 or 20 in Fig. 1 for example, and the scale of the instrument calibrated accordingly. The instrument might even be used on direct or alternating currents to measure resistances in which case a standard resistance would be compared to the unknown resistance, such resistances replacing the elements 19 and 20 in Fig. 1. Many other uses and arrangements will occur to those skilled in the art.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:—

1. An electrical instrument having cooperating stationary and movable members, each member carrying windings and one member carrying a magnetic vane, said vane having its longitudinal axis fixed at an angle to the flux axis of the winding on the same member, the winding on one of said members being divided into a pair of coils, and means for connecting said coils in opposition in parallel circuits and in series with the winding on the other member.

2. An electrical instrument having a pair of coils arranged side by side so as to have a common flux axis, a magnetic vane secured in fixed relation to said coils, and a winding relatively movable with respect to said coils and magnetic vane, said coils being connected in opposition in parallel circuits and in series with said winding, the flux of said winding cooperating with the resultant flux of said two coils and with said magnetic vane to produce opposing torques.

3. An electrical instrument having a pair of coils arranged side by side so as to have a common flux axis, a magnetic vane secured in fixed relation to said coils with its longitudinal axis substantially at right angles to the common flux axis of said coils, a winding relatively movable with respect to said coils and magnetic vane, and connections for connecting said coils in opposition in parallel circuits and in series with said winding, the flux of said winding cooperating with the resultant flux of said coils and with said magnetic vane to produce opposing torques.

4. An electric measuring instrument having a stationary field winding and a movable armature member comprising a pair of coils arranged side by side so as to have a common flux axis and a magnetic vane secured in fixed relation with said coils with its longitudinal axis at substantially right angles to the common flux axis of said coils, means for connecting said coils in opposition in parallel circuits and in series with said winding, the arrangement being such that the position of the armature member is determined by the difference between the torque produced by the influence of the field flux on said magnetic vane and the torque produced by the influence of the field flux on the resultant flux of said coils.

5. A frequency responsive instrument having a pair of coils arranged to produce fluxes along a common axis, a magnetic vane secured in fixed relation with said coils and having its longitudinal axis at substantially right angles to the flux axis of said coils, a field winding relatively movable with respect to and cooperating with said coils and magnetic vane, connections for connecting said coils in opposition in parallel circuits and in series with said field winding, and means included in said parallel circuits for varying the current distribution between said coils in response to variations in frequency.

6. An electric measuring instrument comprising relatively rotatable field and armature members, a scale secured in fixed relation with one of said members, a pointer cooperating with said scale secured in fixed relation with the other of said members, said armature member comprising a pair of coils placed side by side so as to have a common flux axis, and a magnetic vane secured in fixed relation to said coils with its longitudinal axis at substantially right angles to said flux axis, said field member comprising a winding for producing a flux field through said armature member along an axis conforming to the longitudinal axis of said magnetic vane when said pointer is in the approximate center of said scale.

7. An electric measuring instrument comprising a field winding for producing a flux along a given axis, an armature member relatively rotatable with respect to said field winding, said armature member comprising differentially connected coils for producing a resultant flux, and a magnetic vane secured in fixed relation to said coils with its longitudinal axis at substantially right angles to the direction of the resultant flux of said coils, said coils and said magnetic vane cooperating with said field winding to produce opposed torques, the magnitudes and relative directions of which are dependent upon the magnitude and direction of the resultant flux of said differentially connected coils.

8. A frequency meter comprising a stationary field winding for producing a flux along a given axis, a rotatably mounted shaft at right angles to said flux axis, an armature member secured to said shaft comprising a pair of coils arranged side by side so as to have a common flux axis at right angles to said shaft, a magnetic vane secured to said shaft substantially in the plane of said coils, flexible conductors for connecting said coils in opposition in parallel circuits and in series with said field winding, means included in said parallel circuits for tuning said circuits for different frequencies, a pointer secured to said shaft and a stationary scale with which said pointer cooperates, said pointer registering with substantially the midpoint of said scale when said magnetic vane takes a position along the flux axis of said stationary field winding.

9. A double range frequency meter comprising relatively rotable field and armature members, said field member comprising a winding for producing a field flux through said armature member, said armature member comprising a pair of coils arranged side by side so as to have a common flux axis and a magnetic vane secured in fixed relation to said coils substantially in the plane thereof, means for connecting said coils in opposition in parallel circuits and in series with said field winding, means included in said parallel circuits for varying the relative distribution of current between said coils in response to frequency changes, and means for varying the current distribution through the meter circuits so as to vary the relative magnitude of the field flux with respect to the resultant flux of said coils for the purpose of varying the sensitivity of the meter.

10. A double range frequency meter comprising relatively rotatable field and armature members, said field member comprising a winding for producing a flux field through said armature, said armature member comprising a pair of coils arranged side by side so as to have a common flux axis and a magnetic vane secured in fixed relation to said coils with its longitudinal axis at substantially right angles to the flux axis of said coils, means for connecting said coils in opposition in parallel circuits and in series with said field winding, means included in said parallel circuits for varying the relative distribution of the current between said coils in response to frequency changes such that the resultant flux of said coils is zero at one predetermined frequency, and means for varying the current distribution through the meter circuits so as to vary the relative magnitude of the field flux with respect to the resultant flux of said coils for the purpose of varying the sensitiveness of the meter, said last mentioned variation being such as not to alter the zero resultant flux-frequency relation of said coils.

In witness whereof, I have hereunto set my hand this thirty-first day of March, 1927.

THEODORE A. RICH.